June 29, 1948.   R. B. McKINNIS   2,444,203
APPARATUS FOR EXTRACTING OIL FREE JUICES
Original Filed May 1, 1940

Inventor
RONALD B. McKINNIS
By Semmes, Keegin Beale & Semmes
Attorneys

Patented June 29, 1948

2,444,203

UNITED STATES PATENT OFFICE 2,444,203

APPARATUS FOR EXTRACTING OIL-FREE JUICES

Ronald B. McKinnis, Winter Haven, Fla.

Original application May 1, 1940, Serial No. 332,809. Divided and this application October 20, 1943, Serial No. 507,048

4 Claims. (Cl. 100—47)

This invention is a devision of my copending application Serial No. 332,809, filed May 1, 1940, which has issued into Patent No. 2,334,783, dated November 23, 1943, and relates to the extraction of juice from fruits and vegetables, and is particularly of use in extraction of juice from citrus fruits, though it is not exclusively of use in connection with fruit of this type.

An objectionable taste often found in canned orange and grapefruit juices is due to peel oil contamination of the juice.

In present extracting machines, the fruit peel is considerably torn and abraded, rupturing the oil sacs in the skin. Burring the juice from halved fruit eliminates rupturing the oil sacs to some extent, but care must be taken in handling and grading the fruit to prevent skin mutilation in the burring operation. Then again, burring does not lend itself to rapid extraction necessary to modern production methods.

An object of the invention is to extract juice from fruits and vegetables in such a manner that gentle pressing takes place without grinding or removal of core, membranes, or any part of the peel.

A further object is to extract quarters of the fruit, or other segments less than a half, for it has been found that some halves do not extract well, particularly where the halves are cut lengthwise of fruit; that is to say, along a line approximately coinciding with the pithy core.

Another object is to extract juice free from peel oil.

Yet other objects are to provide a system that does not need a timing mechanism, and which will handle various sizes of fruit.

While the apparatus shown is one modification of the system which I may employ, it is to be understood that many other modifications will fall within the spirit of this invention, and other objects will be apparent from the ensuing description.

It has been found that by cutting the fruit into quarters, and then gradually bending the skin outwardly to flatten the quarters, the juice may be removed from the fruit without being contaminated by peel oil from ruptured cells.

The above process may be put into practical effect by passing the individual quarters of fruit between two surfaces which form a gradually constricting passage throughout their length. The input end of this passage is virtually triangular in shape, i. e. the shape of a lateral section of a quarter of the fruit. As the passage progresses, the trough formed by the trough-shaped surface gradually flattens so that that surface parallels to the flat surface against which the peel contacts, and is spaced from it approximately the thickness of the fruit peel.

As the fruit quarters progress through this passage, their shape is gradually flattened and juice is squeezed from them by pressure of the two converging surfaces. At a point in the passage intermediate the ends, where the distance between the surfaces is about equal to the thickness of the skin plus the thickness of seed, one of the surfaces may be perforated to form a grid through which the seed may be expelled, thus allowing the remaining juice to be pressed out.

A wide range of sizes of fruit may be handled indiscriminately by the above process, thereby simplifying the grading of the fruit and the multiplication of the extractors. Neither is there the necessity of timed operation required in ordinary automatic juice extraction, another great advantage in increasing output.

Figure 1:
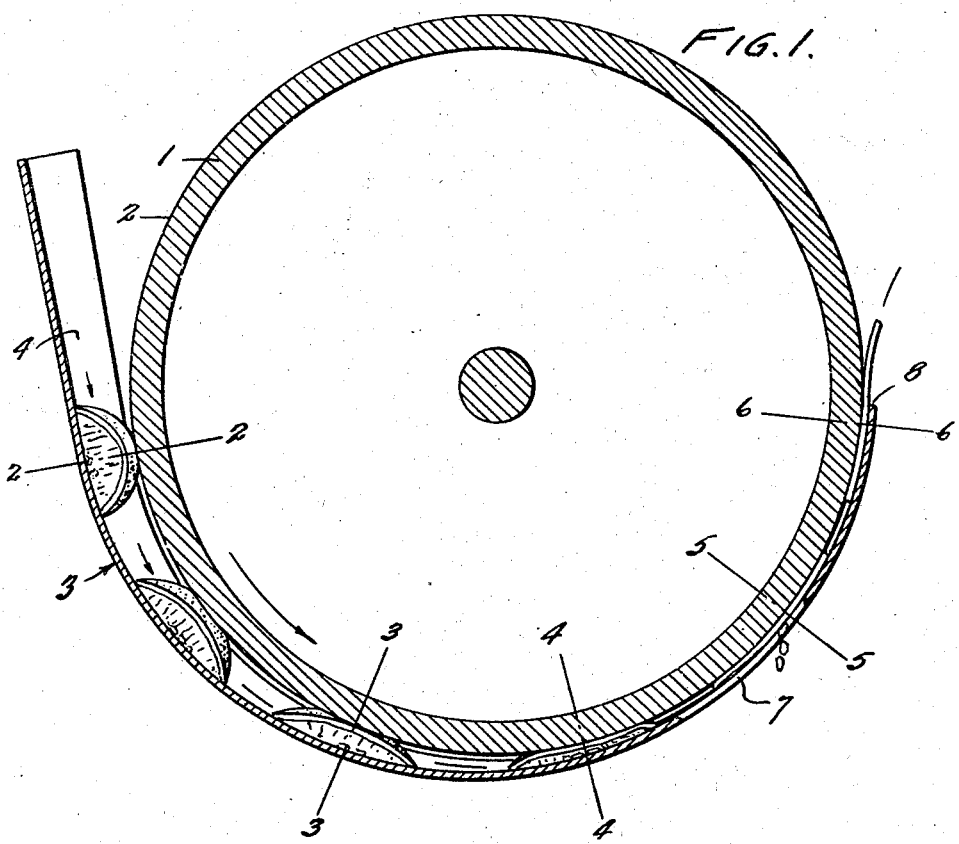
Figure 1 is a diagrammatic sectional view taken through an expressing mechanism to illustrate the method.
Figures 2, 3:
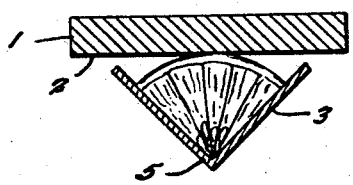
Figure 2 is a view taken along line 2—2 of Figure 1.
Figure 3 is a view taken along line 3—3 of Figure 1.
Figures 4, 5:
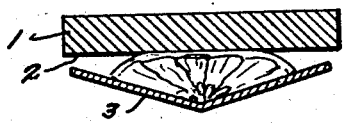
Figure 4 is a view taken along line 4—4 of Figure 1.
Figure 5 is a view taken along line 5—5 of Figure 1.
Figure 6:
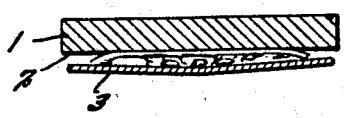
Figure 6 is a view taken along line 6—6 of Figure 1.

Figures 1 to 6 may be referred to, to diagrammatically illustrate one method of carrying out this process. The numeral 1 designates a rotating drum of relatively large diameter. The cylindrical surface 2 of this drum represents a plane pressure surface and is adapted to contact the skin of the fruit quarters. Adjacent the surface 2 is an arcuate plate 3 which gradually spirals toward the drum. The lateral shape of the plate 3, at its input end 4, forms approximately a right angle, as indicated at 5. From the end 4 this angle gradually increases throughout the length of the plate until it attains 180° at 6. Here the space between the plate 3 and the drum 1 is slightly greater than the maximum thickness of skin plus seed which may be encountered. Elongated slots 7 are formed in the plate 3 at this point. The plate 3 continues its spiral approach to the drum 1 to the end 8, where it is spaced from the drum by approximately the skin thickness.

Quarters of fruit are fed into the passage between the drum and plate at the triangular end 4, where the periphery of the moving drum makes a frictional contact with the skin and carries the fruit with it. As the angle of the plate 3 increases so that its apex approaches the drum, the skin is gradually flattened and the juice expelled from the fruit.

When the fruit reaches the grid formed by slots 7, the seeds are expelled through the slots and the remaining juice pressed out. Peels are discharged over the end 8 of the plate 3, and the expressed juice may be further processed, such as strained, pasteurized and canned.

Though I have shown the oranges as quartered, it is to be understood that pieces of less or greater size than a quarter of an orange or grapefruit may be used. Though the surface against which the juice sacs rest at the start of the pressing operation is indicated as a surface formed by two smooth surfaces at right angles to each other, it is to be understood that it is not necessary to have this angularity exact. Particularly is this true where pieces of fruit of, for instance, smaller sizes than quarters are used in the operation.

Some of the main features of the operation are that the fruit shall be cut in sizes such that when the pieces are gradually flattened out there will be but slight opportunity for the peel oil to be expressed in quantities such as to substantially contaminate the juice. This can be clarified by saying that the peel must not be bent sufficiently to rupture many oils sacs in the peel. To minimize the rupturing of oil sacs in the peel, two factors should be kept in mind: first, the peel must be flattened gradually; second, the piece of peel attached to each segment of fruit must be sufficiently small so that it will not need to be flexed greatly to flatten it.

It is to be noted that the rupture of the juice sacs against the angularly disposed surfaces lubricates the movement of the segments over such angularly disposed surfaces. There is also a strong tendency for the peel side of the fruit to adhere to the rotating or moving member, which causes the segment to move over the squeezing surface. Rupture of the juice sacs thus acts as a true lubricant to facilitate the movement of the segments during the expressing operation.

I claim:

1. An apparatus for extracting juice from segments of citrus fruit comprising a rotatable drum member having a smooth cylindrical peripheral surface, and a smooth stationary plate member spiraling toward the peripheral surface of the movable drum forming therewith a gradually constricting passageway having an input end and an output end, the stationary plate member being spaced from said peripheral surface at the input end of the passageway a distance substantially in excess of the thickness of the fruit segment and being spaced from the peripheral surface at the output end of the passageway a distance substantially the thickness of the fruit peel, said drum member being adapted to move the fruit segments through the constricting passageway to extract the juice therefrom, the said plate having longitudinal slots therein extending from a region of the plate which is spaced from the drum a distance substantially equal to the thickness of the fruit peel plus the thickness of the fruit seed to a region which is spaced from the drum substantially the thickness of the fruit peel, said slots having a width sufficient to permit passage of seed from said passageway thereby permitting further compression of the fruit segment and complete extraction of juice therefrom.

2. An apparatus for extracting juice from segments of citrus fruit comprising a rotatable drum member having a smooth cylindrical peripheral surface, and a smooth stationary plate member spiraling toward the peripheral surface of the movable drum forming therewith a gradually constricting passageway having an input end and an output end, said plate member being trough shaped at the input end of the passageway and gradually flattening as the passageway progresses toward the output end, said rotatable drum being adapted to move the fruit segments through the passageway with the cut portion of the segments in contact with the stationary plate to gradually flatten the segments and express the juice therefrom.

3. An apparatus for extracting juice from segments of citrus fruit comprising a rotatable drum member having a smooth cylindrical peripheral surface, and a smooth stationary plate member spiraling toward the peripheral surface of the movable drum forming therewith a gradually constricting passageway having an input end and an output end, said plate member being trough shaped at the input end of the passageway and gradually flattening as the passageway progresses toward the output end, said rotatable drum being adapted to move fruit segments through the passageway with the cut portion of the segments in contact with the stationary plate to gradually flatten the segments and express the juice therefrom, said plate member being apertured near the discharge end of the passageway to permit passage of seeds therefrom.

4. An apparatus for extracting juice from segments of citrus fruit comprising a rotatable drum member having a smooth cylindrical peripheral surface, and a smooth stationary plate member spiraling toward the peripheral surface of the movable drum forming therewith a gradually constricting passageway having an input end and an output end, said plate member being trough shaped at the input end of the passageway and gradually flattening as the passageway progresses toward the output end, said rotatable drum being adapted to move fruit segments through the passageway with the cut portion of the segments in contact with the stationary plate to gradually flatten the segments and express the juice therefrom, said plate member being provided with elongated slots near the discharge end of the passageway to permit passage of seeds therefrom.

RONALD B. McKINNIS.

REFERENCES CITED

The following references are of record in the file of this patent:

UNITED STATES PATENTS

| Number | Name | Date |
|---|---|---|
| 363,827 | Hinsdale | May 31, 1887 |
| 598,150 | Howell | Feb. 1, 1898 |
| 895,446 | Forssman | Aug. 11, 1908 |
| 1,600,882 | Jacobson | Sept. 21, 1926 |
| 2,212,066 | Fry | Aug. 20, 1940 |